United States Patent Office 3,544,190
Patented Dec. 1, 1970

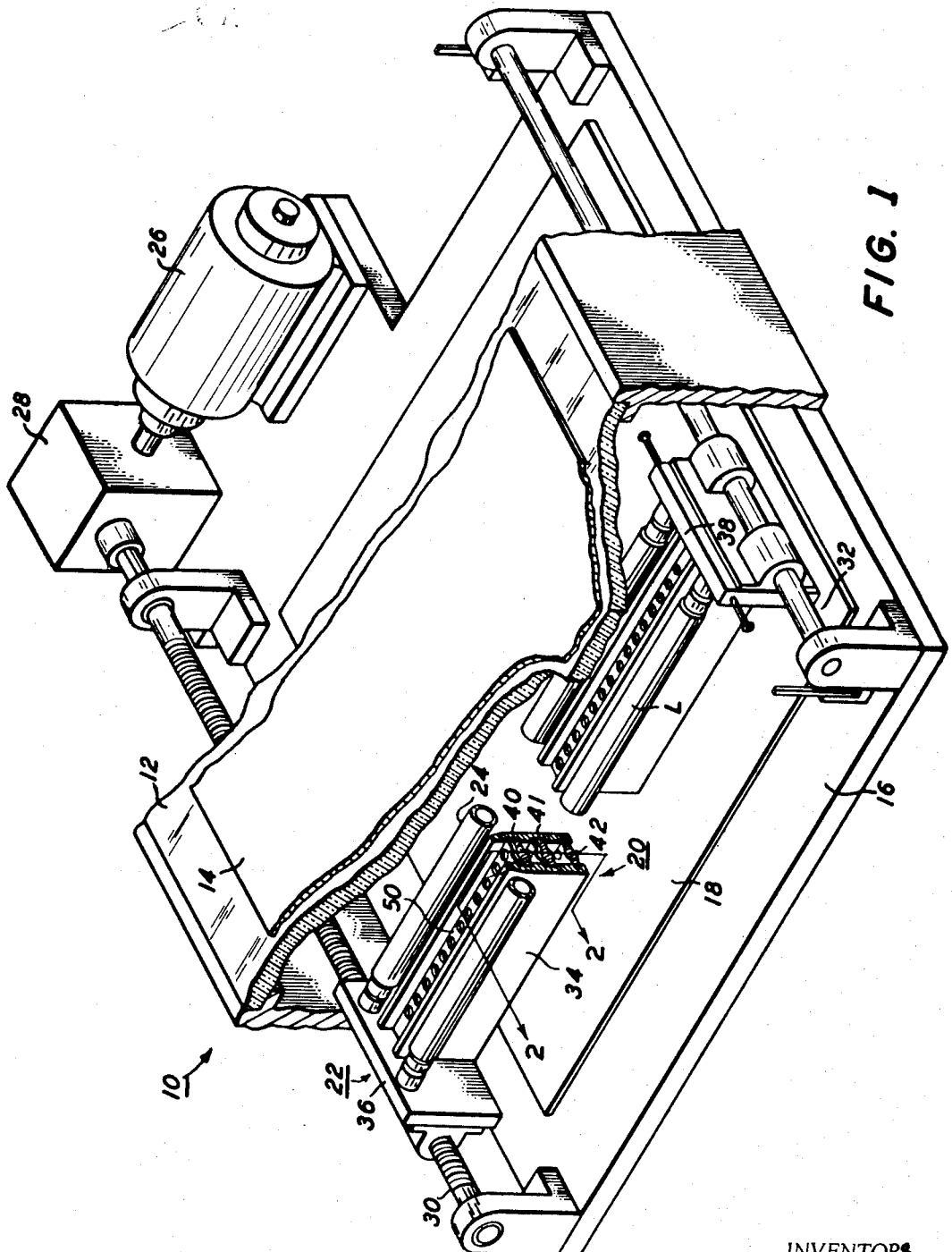

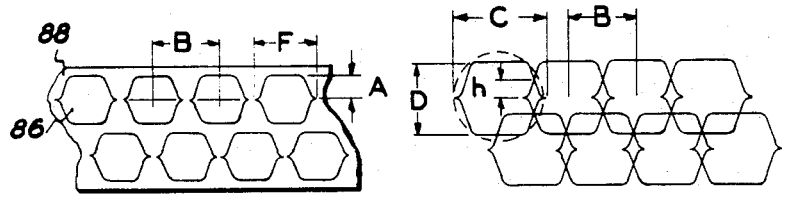
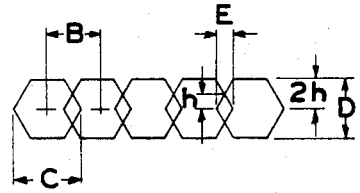
FIG. 4     FIG. 5
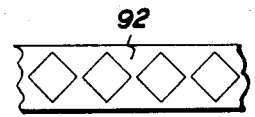
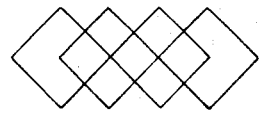
FIG. 6     FIG. 10
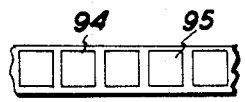
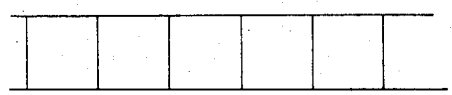
FIG. 7     FIG. 11
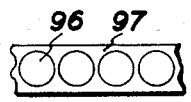
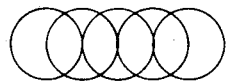
FIG. 8     FIG. 12
FIG. 9     FIG. 13

3,544,190
LENS STRIP OPTICAL SCANNING SYSTEM
Robert W. Moorhusen, Penfield, and David C. Harper, Rochester, N.Y., assignors to Xerox Corporation, Rochester, N.Y., a corporation of New York
Filed Nov. 29, 1968, Ser. No. 780,143
Int. Cl. G02b 17/00, 27/00
U.S. Cl. 350—6                                    9 Claims

ABSTRACT OF THE DISCLOSURE

Apparatus for forming a continuous image from an object at 1:1 magnification with a lens strip optical imaging system having a series of individual optical imaging devices with an internal field stop. The magnification of the object through a first lens to the field stop is reduced in size from the size of the object and is then magnified by another lens element to the image plane where the image is at 1:1 magnification to the object. The field stops of the series of optical imaging devices may be of varying shapes to achieve illumination uniformity at the image surface of the system.

---

The present invention relates to an optical imaging device and more particularly to an optical imaging system of short focal length forming an image at 1:1 magnification with respect to the object viewed.

In the search for practical short focal optical systems to be used in such applications as office copying machines, various devices have been proposed including a lens strip optical system which is the subject matter of copending applications Ser. Nos. 685,837 filed in the name of R. W. Gundlach on Nov. 17, 1967 and 689,557 filed in the names of R. W. Gundlach et al. on Nov. 17, 1967.

The invention herein described is an improvement in that lens strip optical system. It permits practical fabrication of the lenses and the supporting members such as field stops and baffles in easily manufactured strips. It also provides for uniform illumination across the image surface during the projection of an object thereon. Importantly, it provides a practical means for fabricating a lens strip in a single straight line for a more easily alignable and narrower optical system. Prior art disclosures give no indication of the methods or means of achieving certain illumination effects or inexpensive designs for supporting means such as aperture and field stops. However, these are described herein by optimizing the individual optical imaging devices and elements therein to provide simple supporting means that can be fabricated easily and can achieve special or generally desirable results.

It is, therefore, an object of this invention to improve lens strip optical systems. Another object of this invention is to provide simply fabricated supportnig means for achieving desired illumination effects.

Yet another object of this invention is to improve means for optimizing the image formed by a lens strip optical imaging system. Still another object is to achieve uniform illumination at the final image plane of the lens strip.

These and other objects are accomplished by optimizing the size of the intermediate image formed by the lenses and providing a field stop near the intermediate image plane which stop is easily fabricated and shaped to achieve desired illumination effects.

For a better understanding of the invention as well as other objects and advantages thereof, reference is directed to the following description taken in conjunction with the accompanying drawings wherein:

FIG. 1 is a schematic isometric view of an optical imaging system utilizing a lens strip;

FIG. 4 shows a plan view of a strip of field stops for a lens strip containing modified hexagonal apertures;

FIG. 5 is an illustration of the pattern of light rays through a lens strip optical system employing a field stop similar to that of FIG. 4;

FIGS. 6–9 illustrate plan views of strips of field stops for forming the light pattens; and FIGS. 10–13 illustrate the pattern of light rays through a lens strip optical imaging system employing field stops similar to that shown in FIGS. 6–9.

Figure 2:
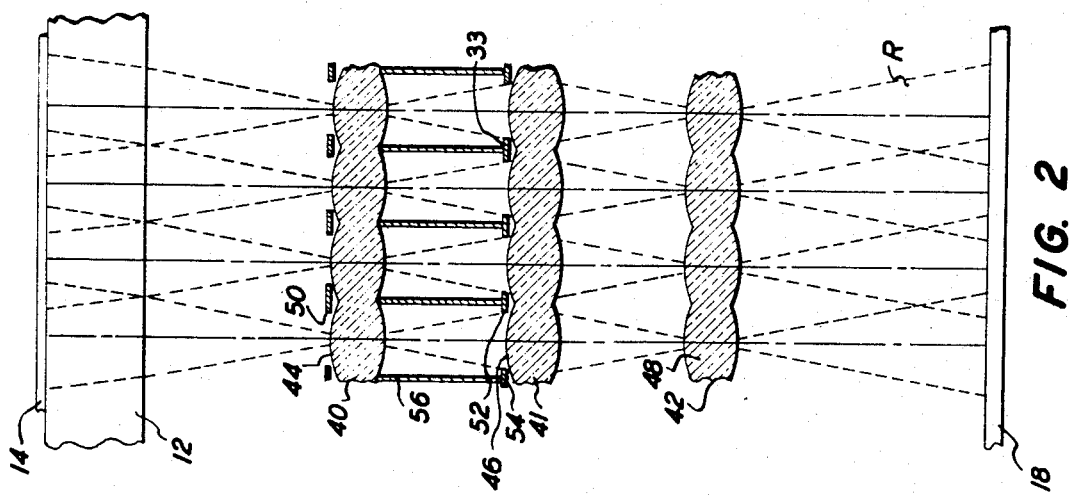
FIG. 2 is a sectional view taken along line 2—2 in FIG. 1 showing a few imaging devices and the optical ray traces for various points on an object to be copied.

Referring now to FIGS. 1 and 2 a representation of a copy machine 10 for accomplishing the objects of the present invention is illustrated. The machine comprises a transparent platen 12 for supporting an object 14 placed face down thereon. The base plate 16 of the machine supports a photosensitive member 18 which serves as the image surface for an optical system, generally referred to as 20, having the object 14 at its object plane and the photosensitive member 18 at its image plane. On a movable carriage 22 which supports the optical imaging system 20 are secured lamps 24 and the lens system and housing. The drive system shown includes a reversible constant speed motor 26 and a gear box 28 for driving the carriage 22 across the opposing faces of the document 14 and the photosensitive member 18.

The carriage 22 may be mounted on any suitable means such as a drive screw 30 and a bearing rod 32 arranged with their axes in parallel and spaced relationship on either end of the support base plate 16. When the motor 26 is activated it, through the gear box 28, turns the drive screw 30 which in turn drives the scanning optical imaging system 20 and the illumination lamps 24 in either direction between the platen 12 and the photosensitive member 18. The scanning optical imaging system moves at a constant velocity and is capable of reversing its direction at the end of its travel.

The optical imaging system comprises a housing 34 supported at one end by a block 36 which threadedly receives the drive screw 30 and at its other end by a block 38 which slidably receives the bearing rod 32. The lamps are physically arranged to be in parallel and are spaced on either side of the housing 34 adjacent the side of the platen 12. The lamps thus illuminate the object 14 placed on the platen thereby producing light rays from the object to pass through the optical imaging system to be imaged on the photosensitive member 18. The overall configuration of the copying machine is shown for illustrative purposes and is not considered a limiting feature on the invention herein.

Three lens strips 40, 41 and 42 are arranged along the length of the housing 34 and each in superimposed relationship relative to the others. The uppermost lens strip 40 is formed, as illustrated, with two parallel rows of lens elements 44 with the second row shifted a distance equal to one-half the distance between any two of the lens elements in a row. The individual lenses along the strip such as the lenses 44 of the strip 40 are made of molded plastic and are an integral part of the plastic forming other portions of the strip. The lenses are shaped in convenient forms for presenting the center portion of a lens used for imaging. This limits some lens aberrations that generally increase in the outer portions of a lens. The strips 41 and 42 are the same as the strip 40 in lens design and power and are arranged relative thereto in such a manner that a lens element of each of the strips is coaxial along the optical path with the lens element of the other strips to form a single imaging device. A single imaging device is comprised of lenses 44, 46 and 48 in the three strips 40, 41 and 42 respectively.

To complete an imaging device an aperture stop 50 is placed along the optical path of the imaging device at the surface of the lens 44 nearest the platen 12. Also, a series of field stop apertures 52 are formed in a field stop aperture plate 54 extending across the entire length of the lens strip. The field stops 52 are arranged to cooperate with each of the lens element 46 on the middle lens strip 41 and are placed on the object side thereof. Secured to the upper side of the plate 54 is a series of non-reflective baffles 56 which extend upwardly to the lower surface of the lens strip 40. The cross sectional area formed by the baffles 56 are preferably rectangular to eliminate as much reflection as possible. The purpose of the series of baffles separating the adjacent lens elements is to prevent scattering of light and cross-talk or crossing of image rays from one imaging device to another.

In FIG. 2 certain image rays are illustrated by dotted lines and labeled as ray traces R showing the fields of view on the object as well as the image area covered on the image surface 18 by each of the optical imaging devices shown.

Figure 3:
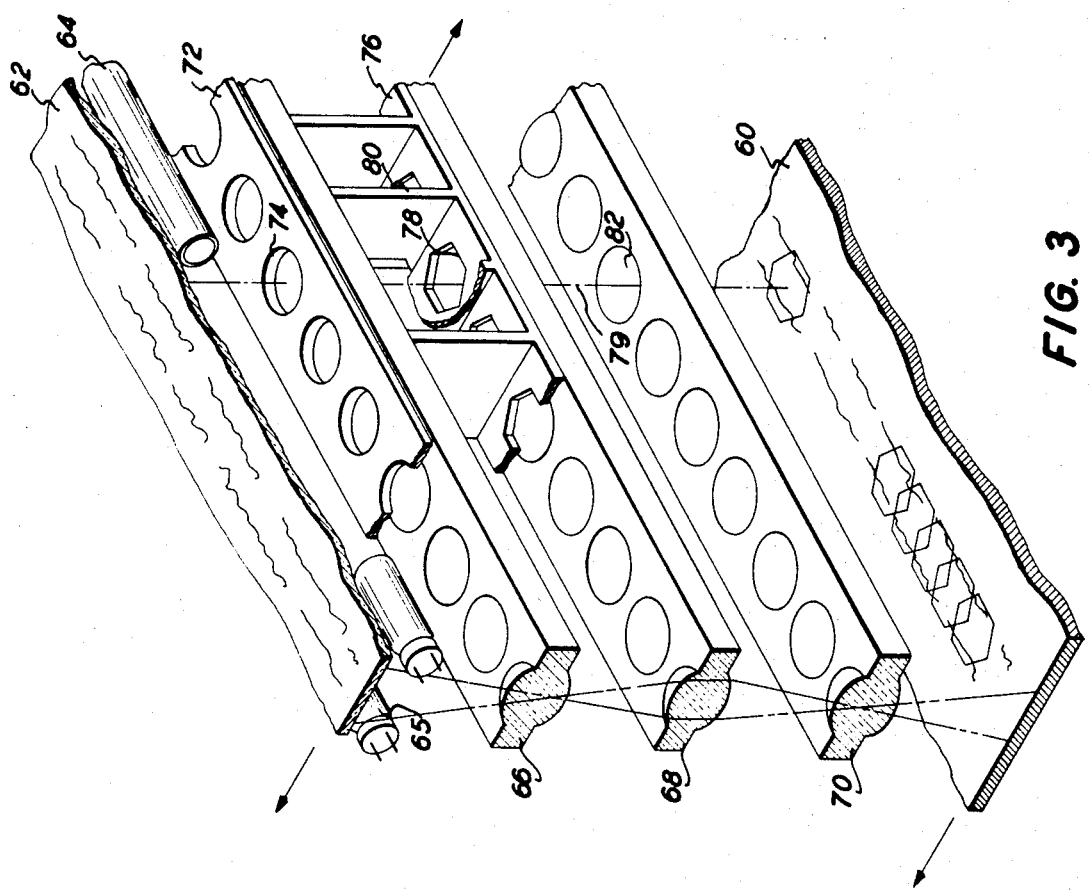
FIG. 3 is an isometric schematic illustration with parts broken away.

FIG. 3 is an isometric schematic of an embodiment of the invention permitting the use of a single row of lenses in a lens strip while achieving uniformly intense illumination at an image plane 60 through scanning an object plane 62. The arrows shown indicate the relative motion between the optical imaging system and the object and image planes.

The object plane is illuminated by two lamps 64 and 65 which would be shielded from the optical imaging system by suitable baffles as well as a housing similar to housing 13 of FIG. 1. The lens strips 66, 68 and 70 are spaced from each other and from the object and image surface such that there is produced on the image surface an image from adjacent imaging devices with overlapping areas positioned to achieve uniformly intense illumination across the image surface as the object is scanned.

Above the lens strip 66 is an aperture stop plate 72 comprised of a series of aperture stops 74 to adjust for the proper illumination of the system during imaging. Positioned above the lens strip 68 is a field stop aperture plate 76 having a row of hexagonally shaped field stops 78 positioned to have their central axes coincident with the central axes of the lenses of each of the optical imaging devices. Between each individual lens of the strip are baffles 80 positioned to prevent cross-talk between the individual imaging devices. Each of the imaging devices are positioned along a single optical axis, such as axis 79, each one containing a portion of the object, an aperture stop 74, a lens from lens strip 66, a set of non-reflective baffles 80, a field stop 78, a lens from lens strip 68, a lens 82 from lens strip 70, and a portion of the image plane.

By providing proper spacing between the parts listed above and the adjacent devices, uniformly intense illumination across the image surface can be achieved during a scan of the object. This may be accomplished by a single row of lenses and by a series of field stops separated from each other at an intermediate image plane at lens strip 68. In fact, the intermediate image formed in the plane of lens strip 68 could be formed on a translucent member, Fresnel lens, or any member that will form a visual image of the light rays affected by the lenses of lens strip 66. The embodiment shown merely provides the most efficient means for gathering the light available from the object for presentation to the final image surface 60. In order to achieve the results desired and to have a single row of lenses in each strip, it is necessary to form a reduced intermediate image.

The lens strips are spaced such that the lenses of the strip 66 form an image, termed the intermediate image of the object 62 in the plane of the lens strip 68. The intermediate image is focused but reduced in size from the object projected by the lens of strip 66. The corresponding lens in strip 70 projects a focused image of the intermediate image at the image surface 60. This is hereinafter called the second image. The lens of the strip 70 is positioned between the strip 68 and image surface 60 such that it enlarges the intermediate image projected. The relationship of the second image size to the portion of the original object 62 projected is at 1:1 magnification.

It is at this magnification that the lenses can be adjusted so that the overlap zone on the image surface 60 is unified such that the portions of the object within the field of adjacent optical devices are superimposed upon one another in a uniform continuous image. At any magnification other than 1:1 the overlap zone will have two separate images not superimposed, one produced by one optical imaging device and the other produced by an adjacent optical imaging device. This unified image provides the benefit of ease of adjusting the lenses for the proper magnification by moving the strips until the overlapped images are superimposed. This added benefit is possible because the intermediate image is reduced in size allowing field stops for each optical imaging device to be maintained separately from field stops of adjacent optical imaging devices.

FIG. 4 is a plan view of a strip of field stops such as the type which could be used in conjunction with the apparatus shown in the previous figures. The field stops 86 within the field stop plate 88 are generally regular hexagons in shape with the sides being basically at 60° to the bases.

The bases of the field stops 86 are straight lines and parallel with each other. The sides are sinusoidal in shape and each of the four sides are generated by the following equation $$Y = \frac{A}{2}\left(\sin\left[90° \frac{8X \text{ in.}}{F \text{ in.}} - 1\right)\right] + 1\right)$$

Where A is the height in the Y direction from the center of the field stop to either the upper or lower base, and F is the field circle diameter in which the modified hexagon is inscribed; and X and Y are conjugate points along the curve forming the sinusoidally shaped side of the hexagon shaped field stop.

FIG. 5 is representative of the light rays striking the image plane from a lens strip employing a field stop mask similar to that of FIG. 4. C represents the field circle diameter in which the modified hexagon is inscribed. B is the center spacing between adjacent lens devices as well as the distance between centers of adjacent field stops. D is the slit width of the exposure slit of single row of optical imaging devices and h is ½ the length of the overlap area. In FIG. 5 every increment of the area covered by a single outline of the field stop can be considered a unit of object illumination meaning that if the object were a uniform light source, the area on that position of the image surface affected by the field would be uniformly illuminated. That covered by more than one field stop is equal to a unit of illumination times the number of fields superimposed on that area.

As the image surface is traversed at equal velocities by the projected image fields, those increments of areas struck by light from only one field in a single row are exposed for a time $t$ to a unit illumination termed $i$. Those incremental portions of the image surface in the area of overlapped fields are struck by two fields per row for a period of time equal to $\frac{1}{2}t$ at twice the unit illumination or $2i$. In algebraic form areas on the image surface can be said to be exposed to illumination at the rate of $i \times 2t$ or $2i \times t$. Since both terms are equal to $2it$, the areas at the image surface have uniform illumination.

These relations are true for the overlapping configurations shown here including the diamonds and hexagons. The added benefit of hexagonal shapes over diamonds are in improved percent error for physical inaccuracies of design or spacing.

If the field stops are regular hexagons as shown in FIG. 6 their affect on the image surface in a lens strip optical imaging system such as described herein would be represented by the light diagram in FIG. 10. If the hexagons are regular, i.e. are equilateral, having six equal sides with the legs at 60° to the bases they abut, the following relationships hold.

$$h = \frac{E}{2} \tan 60°$$

$$E = C - B$$

$$C = D \sec 30°$$

Error in slit width $= 4h - D$; percent error $= 100$ $$\times \frac{4h - D}{D} = 100 \times \frac{\frac{4(D \sec 30° - B)}{2} \tan 60° - D}{D}$$

where
- $h$ = the maximum overlap in the Y direction from the centerline,
- $E$ = the maximum overlap in the X direction between adjacent fields, and
- $D$ = slit width Therefore, by proper spacing and size relationships uniformly intense illumination and image overlap can be achieved with regular hexagon field stop masks 90 made in a plate 91 such as in FIG. 6. Achieving uniform illumination with an hexagonally shaped field stop such as shown in FIGS. 4 and 6 requires an overlapping of the images of adjacent stops. The image overlap is controlled by the field stop in conjunction with lens spacing and is balanced to give a uniform exposure along the slit width during scanning. The exposure slit width is proportional to the focal length of the lenses and is a compromise between degradation due to field curavture as the field is increased and scanning exposure speed which increases with an increased slit width. The slit width is determined by the size of the field stop located at the object side of the middle lens of the optical imaging devices.

The hexagonal shape is generally preferred to the other shapes described hereinafter. There is more tolerance in the overlap of hexagons because errors in hexagon size cause only a gradual change in slit illumination and are less likely to cause streaking during scanning and later development. Also, the stop fills 86.6 percent of the circle in which it is inscribed giving greater illumination capabilities than stops with less sides.

The maximum dimensions of the field stops and therefore the intermediate image formed by the system are 0.75 time the second image size and the object size. This limit is derived from the fact that each device with this field stop independently covers 75% of the object with 25% shared with the device adjacent to it. For a different geometric field stop, this maximum limit changes. It has been found that an intermediate image equal to 0.6 time the reduction in magnification from the object and second image is desirable. This intermediate image is magnified back to full size at the image surface by the third lens of the optical imaging device. By providing a 0.6 reduction in magnification of the intermediate image, the field stops may be positioned in a simple straight line with small lands separating them on the field stop plate. Also, there is room to provide the necessary non-reflective baffles between devices. The spacing of the stops are equal to the spacing of the optical devices. The length of the opening is labeled F in FIG. 4. F is related to C (the image length) times the magnification of the blow-back. F plus the land dimension between stops equals the spacing of the devices (designated B). The magnification is set to be $F/C$.

This arrangement and relationship allows the images on the image surface to overlap when the lens is not scanning. This provides an excellent means for adjusting the system to give a precise image. By providing complete object and image surface coverage with a single row of lenses, as can be accomplished with the hexagonal and modified hexagonal stops, a narrow strip lens has double the speed feasibility of a double row of offset lens strips where each row fills in intermediate portions of the image. If two rows are desired, one can nearly double the speed again of the system since there would be twice the exposure slit width as with a single row. If two rows are used and each covers the entire image surface with image light rays as it scans across the object, it would still be beneficial to offset the second row from the first giving inherently more uniform illumination because of the greater averaging affecting of inconsistencies within the structure.

The uniformly intense illumination supplied by the field stops in conjunction with the lens strip as described above is illustrated by determining the amount of the illumination at any given point of the image surface during the scanning of the lens strip relative to the image surface. Consider each field on the image surface as having a unit illumination. There is double unit illumination on those areas of the image surface overlapped by two fields. With the hexagonal shaped field and the modified hexagonal shaped field of FIGS. 10 and 5 respectively, illumination across the image surface and across the fields of the individual imaging devices would be substantially uniform. As the illumination during the scan drops off where the field of slit width drops off, it is immediately compensated for by the adjacent field. The compensation and drop off are both gradual, more so in the modified hexagon shape than even in the hexagon shape.

If the device is prefectly balanced and spaced, total uniformity of illumination is achieved at the image plane. If, however, there is some error the effect of illumination change across the image surface will be graduate thereby decreasing the likelihood of streaks developing when an object is scanned under imaging conditions.

Similarly as shown in FIGS. 7 and 11, field stops shaped as squares and oriented tip to tip along a plate 92 can form the field stops for the individual optical imaging devices. Their overlapping pattern on the image surface is shown in FIG. 11. The spacing between centers of the stops and the field formed on the image plane would be equal to $\frac{1}{2}$ the diameter of the circle in which the squares are inscribed. This spacing would permit uniformly intense illumination at the image surface when the optical imaging system performs its scanning function. If the stops are squares 94 oriented in a plate 95 as shown in FIG. 8, the adjacent image field would not overlap but would abut as shown in FIG. 12. This is necessary to achieve uniformly intense illumination at the image surface. The field stops 96 shown in the strip 97 of FIG. 9 are circular. These stops, no matter how spaced relative to adjacent stops, cannot achieve uniformity of illumination even though the fields of adjacent stops on the image surface may fully overlap as shown in FIG. 13.

Uniformity of exposure is significantly important with many photosensitive surfaces in order to eliminate streaking during the scanning of the optical imaging system relative to the image surface. If there is non-uniformity of exposure or a severe drop-off or increase of illumination from one portion of the optical imaging scanning system to another, latent streaks of light will result on the image surface. These will then develop into the image causing a degradation. Therefore, the preferred embodiments of this invention have shaped field stops for providing gradual change in illumination even if complete uniformity across the entire image surface is not achieved. The hexagon and modified hexagon shapes for field stops appear to achieve this result best. This is so since the dropoff from one optical imaging device with a generally hexagonally field stop is incrementally compensated for by the adjacent optical imaging device since one gradually tapers off while the other gradually increases the area covered by it for providing illumination.

If the stop is shaped with a sinusoidal side such as the modified stop of FIG. 4, the dropoff is even more graduate than the regular hexagonal shape and therefore presents even less of a likelihood of streaking due to illumination dropoff with the areas covered by adjacent field stops.

While this invention has been described with reference to the structures disclosed herein and while certain theories have been expressed to explain the experimentally obtainable results obtained, it is not confined to the details set forth; and this application is intended to cover such modifications or changes as may come within the purposes of the improvements or the scope of the following claims.

What is claimed is:

1. In a strip optical imaging system including a plurality of optical imaging devices arranged to receive light rays from an object and to project them to an image surface, each of the optical imaging devices comprising a plurality of optical elements arranged along a common optical path extending between the object and image surface, the optical imaging devices disposed adjacently to receive light rays from contiguous portions of the object and to project them to the image surface for forming a continuous image of the portions of the object projected, means for producing substantially uniform illumination at the image surface including means to produce a first image reduced in size from the object and located intermediate said optical elements, a field stop associated with each of the optical imaging devices and positioned near the focal plane of the first image thereof.

means to blow back said first image to a second image at the image surface means associated with said optical imaging devices for causing relative motion between said devices and the image surface, said field stops of adjacent devices positioned relative to each other such that their projected fields at the image surface interact to provide uniform illumination when said devices are moved relative with said image surface so that uniformly intense illumination is presented across the image surface.

2. The apparatus of claim 1 wherein said field stop is a regular hexagon in shape with the parallel sides thereof being straight lines.

3. The apparatus of claim 1 wherein said field stop is generally hexagonal in shape with the parallel bases thereof being straight lines and the other sides thereof being of sinusoidal shape.

4. The apparatus of claim 3 wherein the sides of the field stop include a general sinusoidal shape conforming to the formula $$Y = \frac{A}{2}\left(\sin\left[90°\left(\frac{8X}{F}-1\right)\right]+1\right)$$

where A is the total height in the Y direction from the center of the stop to the parallel side and F is the field circle diameter in which the stop is inscribed and X and Y are the conjugate points along the curve forming the sinusoidally shaped side of the stop.

5. The apparatus of claim 1 wherein said field stop is rectangular and positioned relative to adjacent stops in adjacent optical imaging devices to form image patterns on the image surface capable of achieving uniformly intense illumination at the image surface.

6. The apparatus of claim 1 wherein said field stop is diamond shape and positioned relative to adjacent stops in adjacent optical imaging devices to form diamond image patterns on the image plane of the system, said diamond image patterns generally overlapping to the center of the adjacent pattern.

7. The apparatus of claim 5 wherein said field stops are square in shape and positioned relative to adjacent stops in adjacent optical imaging devices such that adjacent image patterns on the image surface generally abut each other.

8. In an optical imaging system for projecting light images from an object toward an image surface, the object and the image surface being in optically opposed relationship for at least parts thereof with the optical distance between the parts substantially fixed, said imaging system including a plurality of optical imaging devices arranged along corresponding optical paths extending between the object and image surface, each of said optical imaging devices including at least two refractive optical means spaced from each other and arranged along a common optical path extending between the object and the image surface, the refractive optical means positioned closer to the object being adapted to invert and revert light rays and form an image in the space between the optical means, the refractive optical means positioned closer to the image surface being adapted to invert and revert light rays and project the image formed in the space between the optical means along the optical path toward the image surface, the optical imaging devices being disposed in laterally adjacent relation so as to receive light rays from contiguous portions of the object and to project them along their corresponding optical paths whereby a continuous image of the portion is projected toward the image surface, the improvement comprising, means positioning said first and second mentioned refractive optical means so as to project light rays from the object to the image surface at a 1:1 optical magnification with a reduced intermediate image therebetween and field stop means positioned in the space between said first and second mentioned refractive optical means.

9. In an optical imaging system for projecting light images from an object toward an image surface, the object and the image surface being in optically opposed relationship for at least parts thereof with the optical distance between the parts substantially fixed, said imaging system including a plurality of optical imaging devices arranged along corresponding optical paths extending between the object and image surface, each of said optical imaging devices including at least two refractive optical means spaced from each other and arranged along a common optical path extending between the object and the image surface, the refractive optical means positioned closer to the object being adapted to invert and revert light rays and form an image in the space between the optical means, the refractive optical means positioned closer to the image surface being adapted to invert and revert light rays and project the image formed in the space between the optical means along the optical path toward the image surface, the optical imaging devices being disposed in laterally adjacent relations so as to receive light rays from contiguous portions of the object and to project them along their corresponding optical paths whereby a continuous image of the portions is projected toward the image surface, the improvement comprising,
- means positioning said first and second mentioned refractive optical means so as to project light rays from the object to the image surface at a 1:1 optical magnification with a reduced intermediate image therebetween and
- six sided field stop means positioned in the space between said first and second mentioned refractive optical means with at least some of the six sides thereof being curved.

References Cited
UNITED STATES PATENTS

| | | | |
|---|---|---|---|
| 1,605,016 | 11/1926 | Trezise | 350—2050 XR |
| 2,536,718 | 1/1951 | Brandon | 350—86 XR |
| 3,085,473 | 4/1963 | Bourgeaux et al. | 350—167 |
| 3,096,512 | 7/1963 | Hollowich et al. | 350—167 XR |
| 3,241,438 | 3/1966 | Frank | 355—50 |
| 3,313,940 | 4/1967 | Goodrich | 350—205 |
| 3,330,908 | 7/1967 | Good et al. | 350—167 XR |

PAUL R. GILLIAM, Primary Examiner

U.S. Cl. X.R.

350—17, 37, 167